(12) United States Patent
Huang

(10) Patent No.: US 7,480,614 B2
(45) Date of Patent: Jan. 20, 2009

(54) ENERGY FEATURE EXTRACTION METHOD FOR NOISY SPEECH RECOGNITION

(75) Inventor: Tai-Huei Huang, Yunlin Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 944 days.

(21) Appl. No.: 10/747,047

(22) Filed: Dec. 30, 2003

(65) Prior Publication Data
US 2005/0071160 A1 Mar. 31, 2005

(30) Foreign Application Priority Data
Sep. 26, 2003 (TW) .............................. 92126759 A

(51) Int. Cl.
*G10L 15/20* (2006.01)
(52) U.S. Cl. .................. 704/233; 704/226; 704/240; 704/219; 704/221; 381/94.2; 381/94.3
(58) Field of Classification Search ......... 704/226–233, 704/240, 219, 221; 381/94.2, 94.3
See application file for complete search history.

(56) References Cited

U.S. PATENT DOCUMENTS

| | | | | |
|---|---|---|---|---|
| 4,811,404 A | * | 3/1989 | Vilmur et al. | 381/94.3 |
| 5,657,422 A | * | 8/1997 | Janiszewski et al. | 704/229 |
| 5,706,394 A | * | 1/1998 | Wynn | 704/219 |
| 5,706,395 A | * | 1/1998 | Arslan et al. | 704/226 |
| 5,950,154 A | * | 9/1999 | Medaugh et al. | 704/226 |
| 6,240,386 B1 | * | 5/2001 | Thyssen et al. | 704/220 |
| 6,415,253 B1 | * | 7/2002 | Johnson | 704/210 |
| 6,535,850 B1 | * | 3/2003 | Bayya | 704/239 |
| 7,058,572 B1 | * | 6/2006 | Nemer | 704/226 |
| 7,146,316 B2 | * | 12/2006 | Alves | 704/233 |

\* cited by examiner

*Primary Examiner*—Vijay B Chawan
(74) *Attorney, Agent, or Firm*—Bacon & Thomas, PLLC

(57) ABSTRACT

The present invention provides an energy feature extraction method for noisy speech recognition. At first, noisy speech energy of an input noisy speech is computed. Next, the noise energy in the input noisy speech is estimated. Then, the estimated noise energy is subtracted from the noisy speech energy to obtain estimated clean speech energy. Finally, delta operations are performed on the log of the estimated clean speech energy to determine the energy derivative features for the noisy speech.

10 Claims, 3 Drawing Sheets

ENERGY FEATURE EXTRACTION METHOD FOR NOISY SPEECH RECOGNITION

BACKGROUND OF THE INVENTION

1. Field of the Invention

The present invention relates to an energy feature extraction method for speech recognition, especially to an energy feature extraction method for noisy speech recognition.

2. Description of Related Art

In a practical application of automatic speech recognition, background noise is a considerable interference, because it usually decreases the accuracy of speech recognition. This background noise is a superposing effect of waveforms. In statistical characteristic, background noise is irrelevant to speech signal. Therefore, as disclosed in related research documents, the second order statistic of noisy speech can be expressed by the sum of second order statistic of noise and speech, wherein the energy of signal is a second order statistic. Further, according to the known speech recognition technique, the delta coefficient of speech energy waveform is a pattern recognition feature that is more important than the spectral coefficient.

As known in the prior art, the speech energy waveform is expressed by a summation of the square of sampled waveform in each speech frame as follows:

$$E_x[t] = \frac{1}{N} \sum_{i=1}^{N} x_t^2[i], \quad (1)$$

where N is the number of sampled waveform in the t-th speech frame. The frequently used first and second orders of delta coefficient can be obtained as follows:

$$\frac{dE_x^l(t)}{dt} \cong \Delta E_x^l[t] = \frac{1}{K} \sum_{i=-D}^{D} i \log E_x[t+i] \quad (2)$$

$$\frac{d^2 E_x^l(t)}{dt^2} \cong \Delta^2 E_x^l[t] = \Delta E_x^l[t+1] - \Delta E_x^l[t-1], \quad (3)$$

where $E_x^l(t) = \log(E_x(t))$, D is the number of speech frames across, and $$K = \sum_{i=-D}^{D} i^2.$$

Generally, a combination of the delta coefficients of the energy waveform and coefficient vectors consisting of other spectral coefficients can increase the speech recognition accuracy. However, in a noisy environment, if background noise and voice signal are irrelevant in statistic, the energy of noisy speech can be expressed as follows:

$$E_y(t) \cong E_x(t) + E_w(t) \quad (4)$$

If the change of noise energy is slower than that of the speech energy, the noise energy $E_w(t)$ can be defined as a constant $e_w$ that does not vary as time goes, and thus $E_y(t) \approx E_x(t) + e_w$. According to the differential formula, the first order differentiation of the log energy by time can be expressed as follows:

$$\frac{dE_x^l(t)}{dt} \cong \frac{1}{E_x(t)} \frac{dE_x(t)}{dt}. \quad (5)$$

Therefore, the first order differentiation of the log of noisy speech by time can be expressed as follows:

$$\frac{dE_y^l(t)}{dt} \cong \frac{1}{E_x(t) + e_w} \frac{dE_x(t)}{dt}. \quad (6)$$

Because of the noise energy $e_w > 0$, we have:

$$\frac{dE_y^l(t)}{dt} < \frac{dE_x^l(t)}{dt}. \quad (7)$$

From the aforementioned description, it is realized that how the additional noise makes differential feature of log energy distort, and this will influence the effect of pattern recognition. Therefore, in a noisy environment, the speech energy waveform will lead to distortion by superposing effect of the aforementioned noise, and further to cause a mistake in speech recognition result.

SUMMARY OF THE INVENTION

The object of the present invention is to provide an energy feature extraction method for noisy speech recognition so as to improve recognition rate of noisy speech.

To achieve the object, in the energy feature extraction method for noisy speech recognition in accordance with the present invention, a noisy speech energy computation step is provided for computing a noisy speech energy of an input noisy speech. A noise energy estimation step is provided for estimating a noise energy in the input noisy speech. A clean speech estimation step is provided in which the estimated noise energy is subtracted from the noisy speech energy to obtain an estimated clean speech energy. An energy feature computation step is provided by performing delta operation on log of the estimated clean speech energy to determine differential coefficient for the noisy speech.

DETAILED DESCRIPTION OF THE PREFERRED EMBODIMENT

Figure 1:
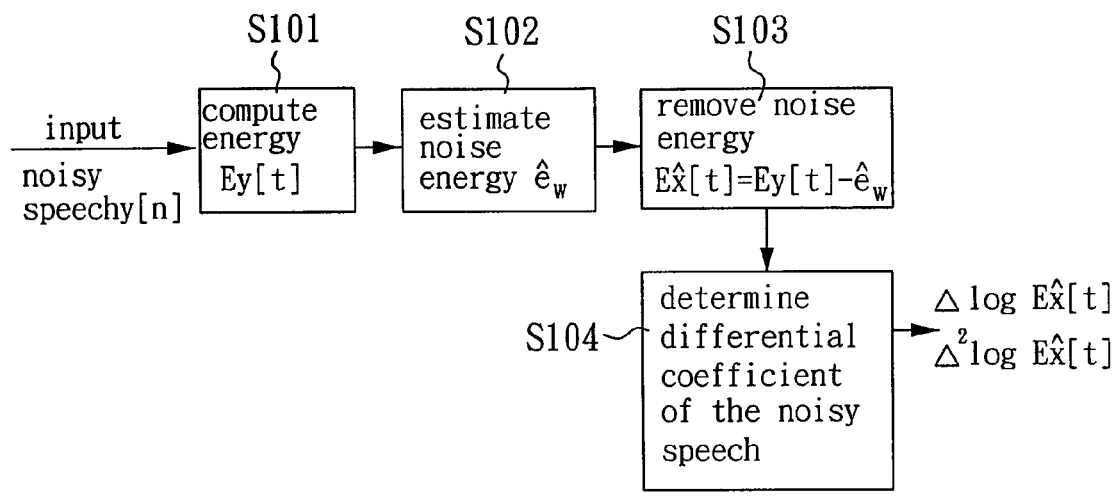
FIG. 1 is a flow chart of the energy feature extraction method for noisy speech recognition in accordance with the present invention.

The first embodiment of the energy feature extraction method for noisy speech recognition in accordance with the present invention is illustrated in FIG. 1, wherein the noise energy is subtracted from the noisy speech energy to reduce distortion of differential feature of log energy. In step S101, noisy speech energy Ey[t] of an input noisy speech y[n] is first computed, where t=1~T is frame index.

In step 102, the noise energy is estimated by using the aforementioned noisy speech y[n] and a dynamic range ratio of speech energy, wherein the dynamic range ratio $r_x$ of speech energy $E_x[t]$ is defined as a ratio of maximum frame energy to minimum frame energy of this speech, that is:

$$r_x = \frac{\max_{t=1,T}(E_x[t])}{\min_{t=1,T}(E_x[t])}, \quad (8)$$

where T is the number of the speech frames in a speech segment x. The dynamic range ratio of speech energy will be decreased due to the effect of additive noise. That is, the dynamic range ratio of noisy speech energy $E_y[t]$, $r_y$, is smaller than the dynamic range ratio of clean speech energy $E_x[t]$, $r_x$, which is given as follows:

$$r_y = \frac{\max_{t=1,T}(E_y[t])}{\min_{t=1,T}(E_y[t])} = \frac{\max_{t=1,T}(E_x[t]) + e_w}{\min_{t=1,T}(E_x[t]) + e_w} < r_x, \quad (9)$$

where $e_w > 0$ is a noise energy. Accordingly, if the dynamic energy range ratio $r_x$ of clean speech is known, and $\hat{e}_w$ is an estimated value of noise energy, by subtracting $\hat{e}_w$ from numerator and denominator of formula (9) respectively, we have:

$$\frac{\max_{t=1,T}(E_y[t]) - \hat{e}_w}{\min_{t=1,T}(E_y[t]) - \hat{e}_w} = r_x. \quad (10)$$

Therefore, the estimated noise energy $\hat{e}_w$ can be obtained as follows:

$$\hat{e}_w = \frac{\max_{t=1,T}(E_y[t]) - r_x \min_{t=1,T}(E_y[t])}{1 - r_x}. \quad (11)$$

In step S103, the estimated noise energy $\hat{e}_w$ is removed from the noisy speech energy $E_y[t]$ to obtain an estimated clean speech energy, which is given follows:

$$E_{\hat{x}}[t] = E_y[t] - \hat{e}_w. \quad (12)$$

Thereafter, in step S104, first and second order delta operations are performed on the log energy $\log(E_x[t])$ of speech energy without noise to determine the first order differential coefficient and second order differential coefficient for the noisy speech as follows:

$$\Delta E_{\hat{x}}^l[t] = \frac{1}{K} \sum_{i=-D}^{D} i \log(E_y[t+i] - \hat{e}_w), \text{ and} \quad (13)$$

$$\Delta^2 E_{\hat{x}}^l[t] = \Delta E_{\hat{x}}^l[t+1] - \Delta E_{\hat{x}}^l[t-1]. \quad (14)$$

Figure 2:
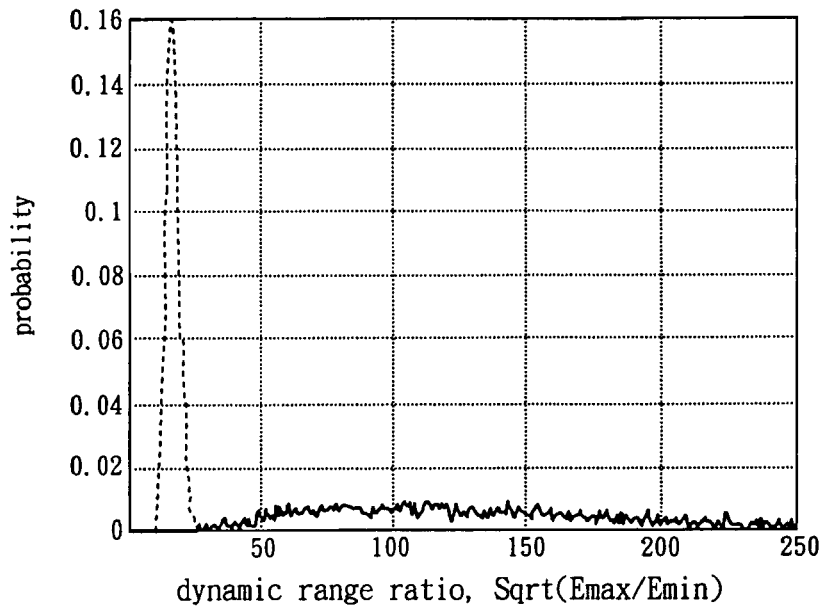
FIG. 2 shows a dynamic range ratio distribution curve of square-rooted energy for clean speech and noisy speech with 20 dB white noise.

In the aforementioned step S102, it is assumed that the dynamic range ratio of speech energy is decreased by the effect of additive noise. To verify such an assumption, the distribution dynamic range ratio of square-rooted energy for the clean speech and noisy speech having 20 db white noise are computed as shown in FIG. 2, wherein the solid line is the ratio distribution of clean speech and the dotted line is the ratio distribution of noisy speech with 20 dB white noise. According to FIG. 2, the ratio distribution of clean speech is more scatter, but most of the ratios are greater than the ratios of noisy speech, and thus the estimated result of step S102 is proved to be correct.

Figure 3:
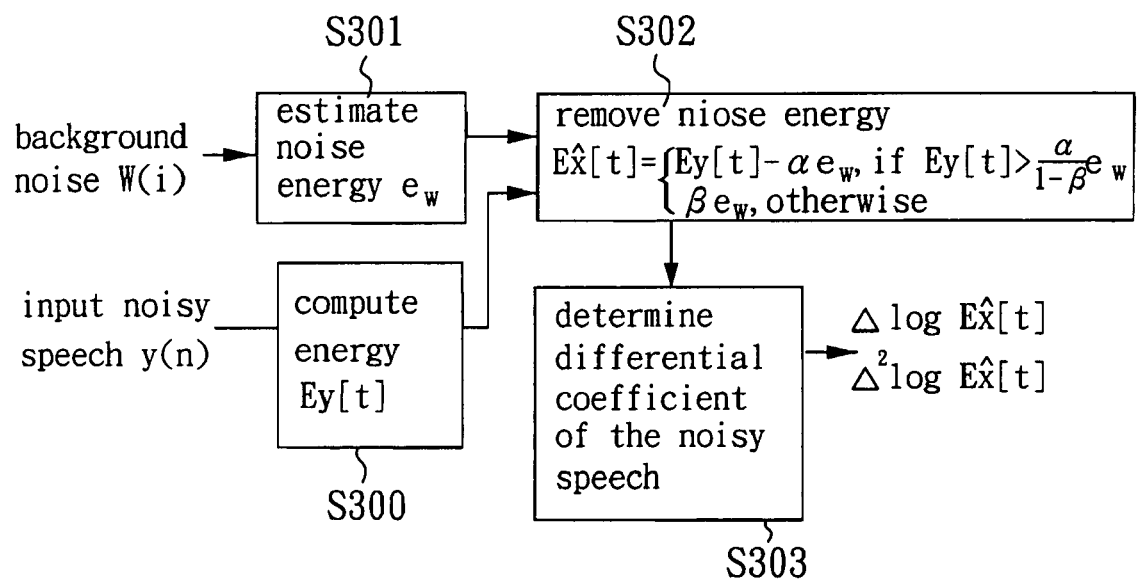
FIG. 3 is flow chart shows another embodiment for implementing the energy feature extraction method for noisy speech recognition in accordance with the present invention.

FIG. 3 shows a second embodiment of the energy feature extraction method for noisy speech recognition in accordance with the present invention. As shown, the step S300 computes the energy $E_y[t]$ of input noisy speech y[n]. The step S301 estimates noise energy by directly computing the energy of pure background noise, and this noise energy is given as follows:

$$e_w = \frac{1}{N_w} \sum_{i=1}^{N_w} w^2[i], \quad (15)$$

where w[i] is the pure background noise, $N_w$ is the number of sampled noisy waveform. In step S302, the estimated noise energy $\hat{e}_w$ is removed from the noisy speech energy $E_y[t]$ to obtain an estimated clean speech energy $E_{\hat{x}}[t]$. However, to avoid generating a negative value by subtracting the pure background noisy energy $e_w$ from the noisy speech energy $E_y[t]$, the speech energy of each frame is computed as follows:

$$E_{\hat{x}}[t] = \begin{cases} E_y[t] - \alpha \hat{e}_w, & \text{if } E_y[t] > \frac{\alpha}{1-\beta} \hat{e}_w \\ \beta \hat{e}_w, & \text{otherwise}, \end{cases} \quad (16)$$

where $\alpha$ and $\beta$ are predetermined constants. In this embodiment, we have $\alpha=0.95$ and $\beta=0.05$. Then, in step S303, first and second order delta operations are performed on the log energy $\log(E_{\hat{x}}[t])$ to determine the first order differential coefficient and second order differential coefficient for the noisy speech as follows:

$$\Delta E_{\hat{x}}^l[t] = \frac{1}{K} \sum_{i=-D}^{D} i \log(E_{\hat{x}}[t+i]), \quad (17)$$

$$\Delta^2 E_{\hat{x}}^l[t] = \Delta E_{\hat{x}}^l[t+1] - \Delta E_{\hat{x}}^l[t-1]. \quad (18)$$

Figure 4:
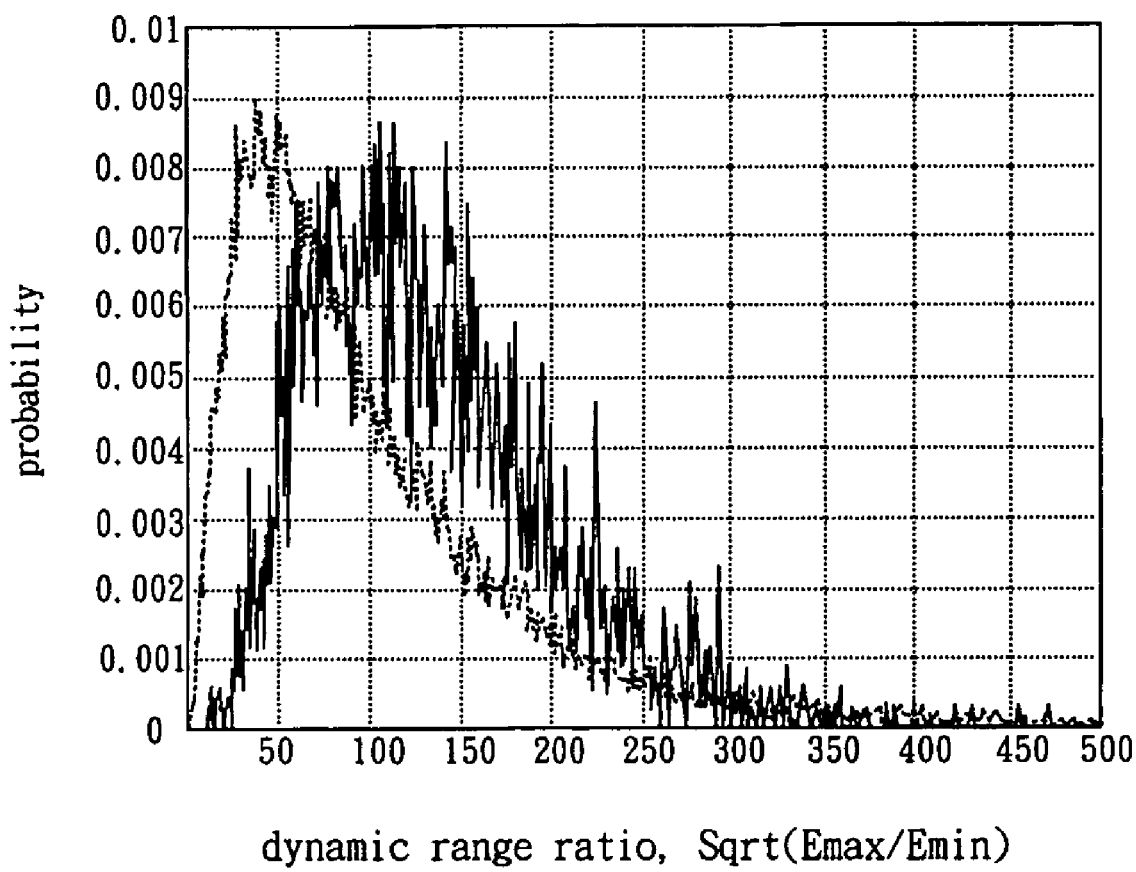
FIG. 4 shows a dynamic range ratio distribution of square-rooted energy for training data of telephone speech and clean speech.

For verifying the advantageous effect in speech recognition obtained by the present invention, the present invention and conventional method are used to perform a name recognition experiment, and the accuracies of the recognitions are compared. In the experiment, the training utterance of speech model is MAT2000. (a database recorded with telephone voices about 2,000 persons). The noisy speech is given by artificially synthesizing a database recorded in a quiet environment and noise samples based on SNRs of 20 dB, 15 dB, 10 dB, 5 dB, 0 dB. There are three types of noise samples in this experiment, which are white noise, babble noise, and factory noise. The clean speech database is recorded in a quite room by 18 males and 11 females using a microphone. The target of the experiment is to recognize a total of 1,073 names. With reference to FIG. 4, there is shown a dynamic range ratio distribution of square-rooted energy of the training utterance and of the clean speech of person's name, wherein solid line is the ratio distribution of clean name speech and dotted line is the ratio distribution of telephone utterance. Both of them are distributed over the field below 400, but most ratios of clean name speech are greater than telephone utterance's. Based on the result of FIG. 4, the constant term of energy dynamic range ratio is selected to be 10000 for estimating noisy energy. In the experiment, a speech feature vector is comprised of 26 coefficients, including twelve Mel-frequency cepstrum coefficients (MFCCs), twelve delta MFCCs, one delta log energy, and one delta delta log energy. In the process of computing MFCCs, a long-time spectrum mean subtraction is employed to reduce the effect on the spectrum coefficients caused by noise. The experiment result is illustrated in Table 1, from which it is known that the recognition rate of the present invention is better than that of the prior art under various testing conditions.

TABLE 1

|  | 20 dB | 15 dB | 10 dB | 5 dB | 0 dB |
| --- | --- | --- | --- | --- | --- |
| White noise | | | | | |
| Prior art | 86.5 | 76.7 | 59.5 | 36.9 | 14.2 |
| Present method 1 | 88.4 | 79.7 | 65.0 | 42.7 | 19.1 |
| Present method 2 | 88.8 | 79.0 | 63.2 | 40.1 | 18.3 |
| Babble noise | | | | | |
| Prior Art | 91.2 | 85.9 | 72.9 | 48.5 | 19.6 |
| Present method 1 | 92.0 | 87.4 | 76.4 | 52.4 | 22.3 |
| Present method 2 | 91.5 | 86.7 | 76.2 | 52.1 | 22.0 |
| Factory noise | | | | | |
| Prior Art | 91.6 | 86.8 | 75.0 | 52.8 | 23.3 |
| Present method 1 | 92.8 | 87.6 | 76.9 | 56.2 | 26.1 |
| Present method 2 | 92.5 | 87.1 | 77.0 | 56.4 | 25.6 |

In view of the foregoing, it is known that the present invention is able to reduce the superposing effect based on normalizing the speech energy waveform, and use the result to decrease the distortion caused by noise. Based on the experiment, it is able to effectively improve the recognition rate for noisy speech by using the coefficients of energy waveform obtained in the present invention incorporating with the other typical speech recognition coefficients. In addition, the calculation complexity is low, and thus the present invention can be easily implemented in a hardware system.

Although the present invention has been explained in relation to its preferred embodiment, it is to be understood that many other possible modifications and variations can be made without departing from the spirit and scope of the invention as hereinafter claimed.

What is claimed is:

1. An energy feature extraction method for noisy speech recognition, comprising:
   a noisy speech energy computation step for computing a noisy speech energy of an input noisy speech;
   a noise energy estimation step for estimating a noise energy in the input noisy speech through the noisy speech energy and an energy dynamic range ratio which is defined as a ratio of maximum frame energy to minimum frame energy in speech, thereby obtaining an estimated noise energy $\hat{e}_w$ as follows:

$$\hat{e}_w = \frac{\max_{t=1,T}(E_y[t]) - r_x \min_{t=1,T}(E_y[t])}{1 - r_x},$$

where $E_y[t]$ is the noisy speech energy, T is the number of speech frames, $r_x$ is the energy dynamic range ratio of clean speech;
   a speech energy estimation step in which the estimated noise energy is subtracted from the noisy speech energy to obtain an estimated clean speech energy;
   an energy feature computation step for performing delta operation on log of the estimated clean speech energy to determine differential coefficient for automatic speech recognition; and
   an output step for outputting the differential coefficient determined in the energy feature computation step to perform noisy speech recognition.

2. The method as claimed in claim 1, wherein, in the speech energy estimation step, the estimated clean speech energy is as follows:

$$E_x[t] = E_y[t] - \hat{e}_w.$$

3. The method as claimed in claim 1, wherein, in the energy feature computation step, the logarithm of the estimated clean speech energy is processed by a first order delta operation to thereby obtain the differential coefficient, which is a first order differential coefficient of logarithm energy of noisy speech as follows:

$$\Delta E_x^l[t] = \frac{1}{K} \sum_{i=-D}^{D} i \log(E_y[t+i] - \hat{e}_w),$$

where D is the number of speech frames across, $$K = \sum_{i=-D}^{D} i^2,$$

$E_x^l[t] = \log(E_x[t])$.

4. The method as claimed in claim 1, wherein, in the energy feature computation step, the logarithm of the estimated clean speech energy is processed by a second order delta operation to thereby obtain the differential coefficient, which is a second order differential coefficient of logarithm energy of noisy speech as follows:

$$\Delta^2 E_x^l[t] = \Delta E_x^l[t+1] - \Delta E_x^l[t-1],$$

where $E_x^l[t] = \log(E_x[t])$.

5. An energy feature extraction method for noisy speech recognition, comprising:
   a noisy speech energy computation step for computing a noisy speech energy of an input noisy speech;
   a noise energy estimation step for estimating a noise energy in the input noisy speech;
   a speech energy estimation step in which the estimated noise energy is subtracted from the noisy speech energy to obtain an estimated clean speech energy;

an energy feature computation step which performs delta operation on log of the estimated clean speech energy to determine differential coefficient for automatic speech recognition; and an output step for outputting the differential coefficient determined in the energy feature computation step to perform noisy speech recognition;

wherein, in the noise energy estimation step, the noise energy in the noisy speech is estimated by directly computing the energy of pure background noise.

6. The method as claimed in claim 5, wherein, in the noise energy estimation step, the estimated noise energy is as follows:

$$\hat{e}_w = \frac{1}{N_w} \sum_{i=1}^{N_w} w^2[i],$$

where w[i] is pure background noise, $N_w$ is the number of sampled noise waveform.

7. The method as claimed in claim 6, wherein, in the speech energy estimation step, the estimated clean speech energy is as follows:

$$E_{\hat{x}}[t] = \begin{cases} E_y[t] - \alpha\hat{e}_w, & \text{if } E_y[t] > \frac{\alpha}{1-\beta}\hat{e}_w \\ \beta\hat{e}_w, & \text{otherwise,} \end{cases}$$

where α and β are predetermined constants.

8. The method as claimed in claim 7, wherein, in the energy feature computation step, the logarithm of the estimated clean speech energy is processed by a first order delta operation to obtain a first order differential coefficient of logarithm energy of noisy speech as follows:

$$\Delta E_{\hat{x}}^l[t] = \frac{1}{K} \sum_{i=-D}^{D} i\log(E_y[t+i] - \hat{e}_w),$$

where D is the number of speech frames across, $$\Delta E_{\hat{x}}^l[t] = \frac{1}{K} \sum_{i=-D}^{D} i\log(E_y[t+i] - \hat{e}_w),$$

and $E_{\hat{x}}^l(t) = \log(E_{\hat{x}}[t])$.

9. The method as claimed in claim 7, wherein, in the energy feature computation step, the logarithm of the estimated clean speech energy is processed by a second order delta operation to obtain a second order differential coefficient of logarithm energy of noisy speech as follows:

$$\Delta^2 E_{\hat{x}}^l[t] = \Delta E_{\hat{x}}^l[t+1] - \Delta E_{\hat{x}}^l[t-1],$$

where $E_{\hat{x}}^l[t] = \log(E_{\hat{x}}[t])$.

10. The method as claimed in claim 7, wherein α=0.95, β=0.05.

* * * * *